Oct. 2, 1934.  W. C. HEDGCOCK  1,975,640
WHEEL AND AXLE ASSEMBLY
Filed Aug. 27, 1930
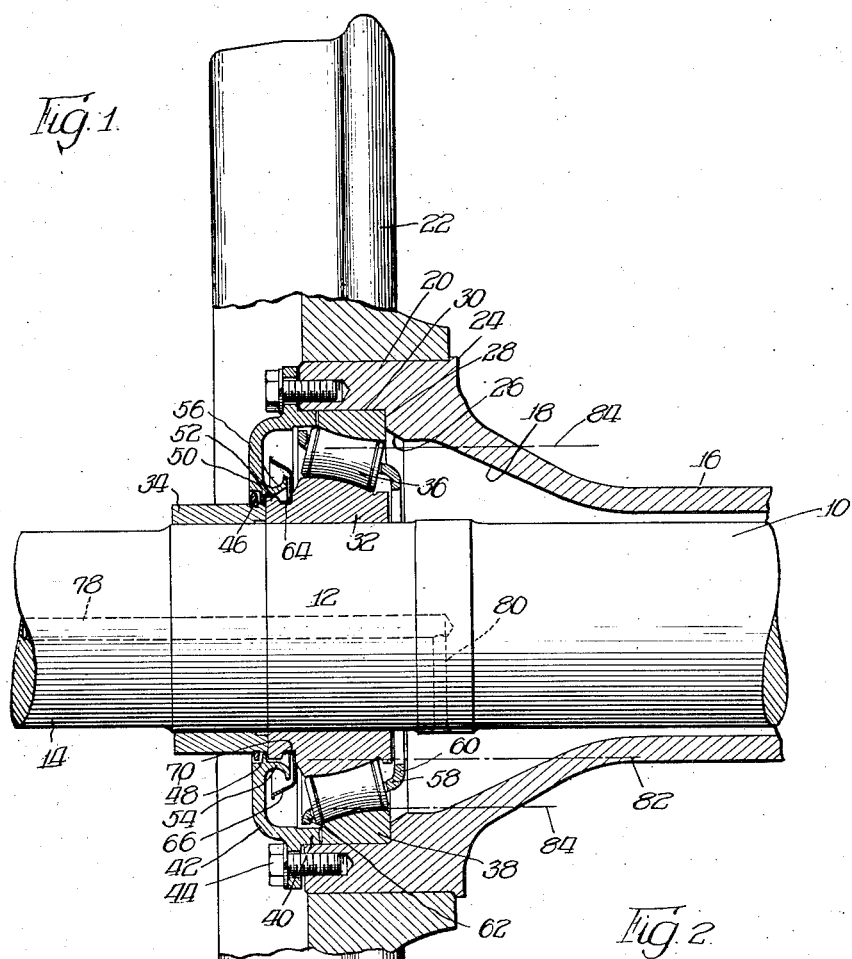
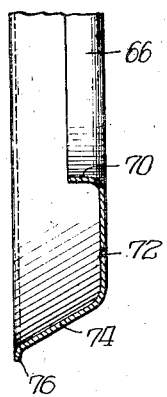
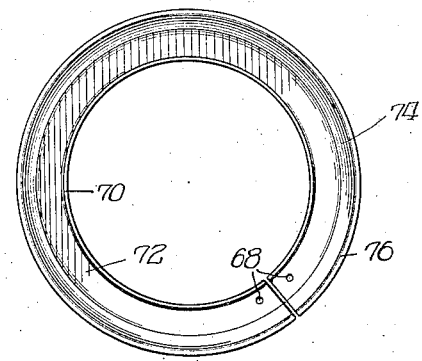
Inventor:
William C. Hedgcock,
By Dickinson, Huxley, Byron & Knight
Attys.

Patented Oct. 2, 1934

1,975,640

UNITED STATES PATENT OFFICE 1,975,640

WHEEL AND AXLE ASSEMBLY

William C. Hedgcock, Wilmette, Ill., assignor to American Steel Foundries, Chicago, Ill., a corporation of New Jersey Application August 27, 1930, Serial No. 478,124

13 Claims. (Cl. 295—36)

This invention pertains to railway rolling stock and more particularly to lubricant deflecting means adapted particularly to be used with anti-friction bearings of wheel and axle assemblies.

It is an object of this invention to provide a lubricant deflector adapted for use with roller bearings mounted between relatively rotatable members for the purpose of preventing excessive loss of lubricant past a closure for the relatively rotatable members.

Another object of the invention is to provide closure and deflecting means adapted to close the lubricant recess of an anti-friction bearing wheel and axle assembly, the deflecting means and closure means being adapted to prevent loss of lubricant between the closure and the normally stationary axle or shaft.

With these and various other objects in view, the invention may consist of certain novel features of construction and operation as will be more fully described and particularly pointed out in the specification, drawing and claims appended hereto.

In the drawing, which illustrates an embodiment of the device and wherein like reference characters are used to designate like parts—

Figure 1 is a fragmentary sectional elevation through a wheel and axle assembly embodying the invention;

Figure 2 is a plan view of the deflector; and

Figure 3 is a fragmentary sectional elevation through the deflector.

In the roller bearing construction illustrated, only certain portions of the assembly are shown and described, but it will be understood that the constructions are duplicated at opposite ends of the assemblies.

The inner normally non-rotatable axle 10 is provided with a cylindrical bearing receiving portion 12 and a cylindrical end bearing portion 14 which is adapted to extend within the usual standard journal box (not shown) and cooperates with the brasses and wedges therein in a well known manner. The outer rotatable axle or casing 16 is flared at its ends to form a lubricant recess 18 and terminates in a wheel receiving portion 20, the wheel 22 being positioned thereon by means of the shoulder 24. The lubricant recess is beveled as at 26 sloping into a shoulder 28 defining the inner cylindrical bearing receiving portion 30.

The cone or inner race ring 32 is mounted on the bearing receiving portion 12 and is positioned thereon by means of the shrink collar 34. A Shafer type of anti-friction bearing is shown though it will be understood that the invention is equally applicable to other forms such as the simplex, frusto-conical, etc. Anti-friction bearings 36 are mounted between the cone and the cup 38, said cup being positioned by the shoulder 28 and retained in operative position by means of the inwardly projecting flange 40 of the closure plate 42, the closure plate being secured to the outer axle by means of the bolts 44 and extending radially inwardly to a point adjacent the shrink collar 34. The shrink collar is provided with the baffle ring 46 and a cooperating portion 48 is formed adjacent the inner edge of the cover plate provided with an inwardly projecting rib 50 adapted to be disposed between the baffle ring 46 and the shoulder 52 provided on the cone 32. The cover plate is provided with the inwardly projecting portion 54 provided with the peripheral groove 56 forming a channel for conducting lubricant from the upper part of the lubricant recess into the lower portion thereof. The anti-friction rollers are positioned by means of the cage 58. The cone is provided with the channel 64 also adapted to conduct lubricant from the upper part of the hub recess to the lower part thereof, and the lubricant deflector 66 is adapted to be disposed in this channel but only partly fills this channel. The lubricant deflector may consist essentially of a dished metallic split ring or plate which may be fed into the groove or channel 64 and snapped into place.

To facilitate assembly and removal of the deflector, apertures 68 are provided near the split junction for receiving a pointed bar whereby the deflector may be lifted out of its groove for disengagement therewith. The inner flange 70 is adapted to be seated in the groove 64, the deflector then extending outwardly, the web 72 thereof being flanged at 74 and reflanged at 76, flange 74 being preferably deeper than flange 70 whereby the flange 74 extends over, overlaps or embraces a substantial part of the channel 56.

In operation, lubricant may be supplied to the lubricant recess through the channel 78 in the inner axle, being forced therethrough and through the channel 80 into said lubricant recess. Lubricant such as oil, grease, etc., may be supplied to a level substantially as shown at 82, which will be the level at the time the roller bearing unit is standing at rest, this level being such that no lubricant will flow past the cover plate. When the roller bearing unit is in operation the outer axle or housing 16 revolves and the lubricant is thrown out by centrifugal force to the outer periphery of the enclosure, assuming a level all around the enclosure at about that indicated at 84. After the lubricant has been carried out to a peripheral position by centrifugal force and the unit is thereafter brought to rest, the lubricant again flows to the bottom of the lubricant recess, seeking to find its original level 82. In doing this, there possibly would be a substantial loss through the peripheral opening of the closure plate should no means be provided for preventing this loss. The deflector which fits into the ordinary peripheral groove 64 causes the greater amount of lubricant to be deflected along the web 66 toward the bearing and thus downwardly to the bottom of the lubricant recess, thus causing a thorough lubrication of the rollers. A slight amount of lubricant however, may drain between the inner surface of the closure plate and the edge of the deflector. This lubricant, however, is caught in the channel 56 provided on the inner face of the closure plate and is carried around said channel onto the lowermost lip or portion of the web of the deflector whence it drains into the base of the lubricant recess. Should, however, a slight amount of lubricant overcome the channel 56, it will be carried into the lubricant groove 64 provided in the cone and will thus be conducted to the lubricant recess.

With this construction it will be appreciated that an efficient deflecting means is provided for anti-friction bearing units, and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a railway wheel and axle assembly the combination of an outer rotary axle having an enlarged wheel hub portion and a bearing recess, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, said bearings including a cup mounted to rotate with said outer axle, a cone mounted on said inner axle, said cone having a peripheral lubricant channel formed therein, and anti-friction rollers mounted between said cone and cup, a shrink collar mounted on said inner axle for positioning said cone, a cover plate disposed between a portion of said shrink collar and said outer axle and having a portion extending towards said anti-friction bearings, said portion being channeled to conduct lubricant from the upper part of said lubricant recess to the lower part thereof, and a deflector member having a portion disposed in said peripheral lubricant channel and another portion overlying the channel in said cover for deflecting lubricant from said channel and toward said anti-friction bearings.

2. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, a member secured to one of said axles for positioning said bearing assembly, a cover plate disposed between a portion of said bearing positioning member and the other of said axles, said cover plate having a portion spaced radially from the race adjacent said bearing positioning member and extending toward said assembly, and a member cooperating with the race adjacent said bearing positioning member and embracing said portion of said cover plate for deflecting lubricant away from said cover plate and toward said bearing assembly.

3. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, a cover plate between said axles and having a portion overlapping one of said races, and means cooperating with said assembly and embracing said overlapping portion for deflecting lubricant away from said cover plate and toward said bearing assembly.

4. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, a cover plate between said axles and having a portion overlapping one of said races, said portion being provided with a lubricant channel, and means cooperating with said assembly and overlying the channel of said cover for deflecting lubricant from said cover plate and toward said bearing assembly.

5. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, a cover plate between said axles, one of said races being formed with a lubricant channel, and a deflector member having a portion disposed in said channel and extending toward said cover plate for deflecting lubricant from said channel and toward said bearing assembly.

6. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, a cover plate between said axles and having a portion extending toward said assembly, one of said races being formed with a lubricant channel, and a deflector member having a portion disposed in said channel and overlying said portion of said cover plate for deflecting lubricant from said channel and toward said bearing assembly.

7. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, a cover plate between said axles and having a portion overlapping one of said races, said race being formed with a lubricant channel, and a deflector member having a portion in said channel and overlying said portion of said cover plate for deflecting lubricant from said channel and toward said bearing assembly.

8. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, one of said races being formed with a lubricant channel, a cover plate between said first-named members and having a portion overlapping said race in spaced relation to said channel, and a deflector member having a portion in said channel and overlying said portion of said cover plate for deflecting lubricant from said channel and toward said bearing assembly.

9. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, one of said races being formed with a lubricant channel, a cover plate between said axles and having a portion overlapping said race in spaced relation to said channel, said portion being provided with a lubricant channel, and a deflector having a portion in said first-named channel and overlying said second-named channel for deflecting lubricant from said channels and toward said bearing assembly.

10. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, one of said races being formed with a lubricant channel, a cover plate between said axles and having a portion overlapping said race in spaced relation to said channel, said portion having a curved end portion extending away from said channel, and a deflector having a portion in said channel and overlying said portion for deflecting lubricant from said channel and toward said assembly.

11. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, a positioning member for said assembly mounted on one of said axles, a cover plate extending between a portion of said positioning member and one of said axles and having a portion overlapping a race adjacent said positioning member, and a deflector carried by said race and overlying said portion for deflecting lubricant from said portion toward said assembly.

12. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, a positioning member for said assembly mounted on one of said axles and adjacent one of said races, said race being formed with a lubricant channel, a cover plate extending between a portion of said positioning member and one of said axles and having a portion overlapping said race in spaced relation to said lubricant channel, and a deflector carried by said race and overlying said portion for deflecting lubricant from said portion toward said assembly.

13. In a wheel and axle assembly, the combination of an inner and an outer axle, said outer axle being spaced from said inner axle and providing a bearing recess, bearing assemblies in said recess and between said axles, each of said assemblies including anti-friction members and cooperating races associated with said axles, a positioning member for said assembly mounted on one of said axles and adjacent one of said races, said race being provided with a lubricant recess, a cover plate extending between a portion of said positioning member and one of said axles and having a portion extending inwardly toward said assembly, and a deflector carried by said race and extending over said channel and cover plate portion for deflecting lubricant from said cover plate and toward said assembly.

WILLIAM C. HEDGCOCK.